US009996752B2

(12) United States Patent
Pham et al.

(10) Patent No.: US 9,996,752 B2
(45) Date of Patent: Jun. 12, 2018

(54) METHOD, SYSTEM AND APPARATUS FOR PROCESSING AN IMAGE

(71) Applicant: CANON KABUSHIKI KAISHA, Tokyo (JP)

(72) Inventors: Quang Tuan Pham, North Ryde (AU); Geoffrey Richard Taylor, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 15/251,933

(22) Filed: Aug. 30, 2016

(65) Prior Publication Data
US 2018/0060669 A1    Mar. 1, 2018

(51) Int. Cl.
*G06K 9/00* (2006.01)
*G06T 7/00* (2017.01)
*G06K 9/46* (2006.01)

(52) U.S. Cl.
CPC ....... *G06K 9/00771* (2013.01); *G06K 9/4604* (2013.01); *G06K 9/4671* (2013.01); *G06T 7/0028* (2013.01); *G06T 7/0042* (2013.01); *G06T 7/0081* (2013.01); *G06T 7/0085* (2013.01); *G06K 2009/4666* (2013.01); *G06T 2207/20112* (2013.01)

(58) Field of Classification Search
CPC ............. G06K 9/00771; G06K 9/4604; G06K 9/4671; G06K 7/0081; G06T 7/0028; G06T 7/0042; G06T 7/0081; G06T 2207/10016; G06T 2207/30196; G06T 2207/30232; G06T 7/292
See application file for complete search history.

(56) References Cited

U.S. PATENT DOCUMENTS

| 6,456,730 | B1 * | 9/2002 | Taniguchi | ............ G06K 9/3241 |
| | | | | 382/103 |
| 6,778,699 | B1 | 8/2004 | Gallagher | |
| 7,956,902 | B2 | 6/2011 | Matsubara | |
| 8,872,925 | B2 | 10/2014 | Xie | |
| 2004/0119848 | A1 * | 6/2004 | Buehler | ............ G06K 9/00771 |
| | | | | 348/239 |

(Continued)

OTHER PUBLICATIONS

F. Lv, et al, "Camera Calibration from Video of a Walking Human." IEEE Transactions on Pattern Analysis and Machine Intelligence (journal), Sep. 2006, pp. 1513-1518, vol. 28, Issue 9, publisher—IEEE.

(Continued)

*Primary Examiner* — Jingge Wu
(74) *Attorney, Agent, or Firm* — Canon U.S.A., Inc. IP Division

(57) ABSTRACT

A method and system associated with a camera view of a moving-object in a scene. The method comprises detecting and tracking the moving object over multiple video frames, estimating an orientation of the moving object in each of the video frames, and constructing a cost map from the estimated orientations over the multiple video frames for finding a minimum cost path over the cost map. The Method also comprises determining regularized orientation estimates of the moving-object from the minimum cost path, and locating the vanishing point of the camera view based on an axis of the moving-object from the minimum cost path, the axis formed by using the regularized orientation estimates.

13 Claims, 11 Drawing Sheets

(56) References Cited

U.S. PATENT DOCUMENTS

| | | | | |
|---|---|---|---|---|
| 2006/0132487 | A1* | 6/2006 | Sada | G06T 7/20 345/427 |
| 2008/0309516 | A1* | 12/2008 | Friedrichs | G06K 9/00805 340/935 |
| 2009/0066490 | A1* | 3/2009 | Mitzutani | G06K 9/00362 340/435 |
| 2010/0027844 | A1* | 2/2010 | Akita | G06T 7/269 382/103 |
| 2010/0066734 | A1* | 3/2010 | Ohta | G06T 15/30 345/419 |
| 2010/0315505 | A1* | 12/2010 | Michalke | G06T 7/251 348/118 |
| 2012/0133769 | A1* | 5/2012 | Nagamine | B60R 1/00 348/148 |
| 2013/0286205 | A1* | 10/2013 | Okada | H04N 7/18 348/148 |
| 2014/0037138 | A1* | 2/2014 | Sato | G06K 9/00805 382/103 |
| 2014/0119654 | A1* | 5/2014 | Taylor | G06T 7/0083 382/173 |
| 2015/0103174 | A1* | 4/2015 | Emura | B60R 1/00 348/148 |
| 2015/0220794 | A1* | 8/2015 | Baba | G06T 7/254 382/103 |
| 2015/0288878 | A1* | 10/2015 | Bae | H04N 5/23229 348/169 |
| 2016/0180547 | A1 | 6/2016 | Pham | |
| 2016/0196654 | A1* | 7/2016 | Aoki | G06T 7/73 382/103 |
| 2017/0090007 | A1* | 3/2017 | Park | G01C 21/206 |
| 2017/0227634 | A1* | 8/2017 | Matsumoto | G01S 13/867 |
| 2017/0294124 | A1* | 10/2017 | Baba | G08G 1/16 |
| 2017/0300780 | A1* | 10/2017 | Baba | G06K 9/6215 |
| 2018/0012068 | A1* | 1/2018 | Tanaka | G06K 9/00369 |

OTHER PUBLICATIONS

J. Liu, et al, "Surveillance Camera Autocalibration based on Pedestrian Height Distributions." Proceedings of the British Machine Vision Conference (conference paper), Jan. 2011, pp. 117.1-117.11, publisher—British Machine Vision Association (BMVA), Durham, England.

R.J. Van Heekeren, et al, "Finding the Minimum-Cost Path Without Cutting Corners." Image Analysis (book), 2007, pp. 263-272, vol. 4522, publisher—Springer-Verlag Berlin Heidelberg, Aalborg, Denmark.

C. Sun, "A Fast Stereo Matching Method." Digital Image Computing: Techniques and Applications (book), Dec. 1997, pp. 95-100, Massey University, Auckland, New Zealand.

S. Bak, et al, "Improving Person Re-identification by Viewpoint Cues." Advanced Video and Signal Based Surveillance (AVSS) (journal), Oct. 2014, pp. 175-180, publisher—IEEE Computer Society.

C. Sun, "Symmetry Detection Using Gradient Information." Pattern Recognition Letters (journal), Sep. 1995, pp. 987-996, vol. 16, issue 9, publisher—International Association for Pattern Recognition.

J. Van De Weijer, et al, "Least Squares and Robust Estimation of Local Image Structure." International Journal of Computer Vision (IJCV) (journal), Sep. 2005, pp. 143-155, vol. 64, issue 2, publisher—Springer, USA.

V. Cantoni, et al, "Vanishing Point Detection: Representation Analysis and New Approaches." Proceedings of the 11th International Conference on Image Analysis and Processing (ICIAP) (journal), Oct. 2001, pp. 90-94, publisher—IEEE.

R. Hartley, et al, "Multiple View Geometry." Computer Vision and Pattern Recognition (CVPR) (journal), Jun. 1999, publisher—Cambridge University Press, Cambridge, United Kingdom.

* cited by examiner

METHOD, SYSTEM AND APPARATUS FOR PROCESSING AN IMAGE

TECHNICAL FIELD

The present description relates generally to image processing and, in particular, to the problem of detecting a vertical vanishing point in an image captured by a camera. The present description also relates to a computer program product including a computer readable medium having recorded thereon a computer program for matching objects between two camera views to determine whether a candidate object is an object of interest.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view any video feed containing a particular suspicious person in order to identify undesirable activities. In another example from the business analytics domain, a shopping centre may wish to track customers across multiple cameras in order to build a profile of shopping habits. In the following discussion, the terms "person", "target" and "object" will be understood to mean an object of interest that may be within view of a video surveillance camera.

Many surveillance applications require targets to be detected, tracked, matched and analysed across multiple camera views. Robust analysis of video is challenging due to the large variation in viewpoint across cameras in a network. In one example, targets observed in a camera with a wide field of view may appear to be geometrically distorted when located far from the centre of the video frame. In another example, targets observed in a camera mounted with a large tilt angle may appear to be oriented away from a vertical direction when located far from the centre of the video frame. These geometric distortions can change the appearance of a target and cause detection, tracking, matching or some other analysis to fail.

The above challenges may be overcome based on knowledge of the geometric properties of the image formation process. In one example, knowledge of the camera geometry can be used to rectify an image to remove geometric distortions. In another example, knowledge of camera geometry can be used to align an observed target to a vertical orientation. Rectifying or aligning an image to a vertical orientation reduces the variation in the appearance of an object due to the viewpoint of the camera. In one application, known as "re-identification", vertical alignment is applied to images of objects observed in two camera views, in order to determine whether the objects have the same identity.

It is well known that camera geometry can be estimated from knowledge of the vanishing points within an image. One known method for determining a vanishing point in an image first extracts at least two straight lines in the image, corresponding to the edges of static objects in the scene. In one example, two nearly vertical straight lines at the boundaries of a building are extracted by applying a Hough transformation to edge pixels in an image. A vertical vanishing point is proposed by taking the intersection of these lines. Additional straight lines that pass near the vanishing point are extracted, and a reliability score for the proposed vanishing point is computed based in part on the length, contrast and intersections of these additional lines. In another example, multiple line segments are detected based on a magnitude of an image gradient. Intersections between multiple pairs of line segments are computed and clustered to determine a vanishing point. The clustering process is repeated multiple times to determine additional vanishing points. A drawback of the two approaches described above is that they rely on the presence of objects with parallel straight edges in an image. Some views in a surveillance camera network, such as a view of an outdoor park, may not contain sufficient parallel straight edges to determine a vanishing point.

Other known methods determine parallel lines from moving objects of arbitrary shape, such as a person, rather than static straight-edged structures. In one example, two known features on the object, such as the head location and foot location, are detected when the object is at different locations in a video frame. A vanishing point is determined at the intersection of the lines connecting the pairs of known features. A vanishing line is then determined from multiple vanishing points computed from different objects or the same object at multiple pairs of locations in the video frame. Finally, the camera geometry is determined from the vanishing line and a known height of at least one object in the image. A drawback of this method is that it relies on an object to maintain a fixed height at different locations in an image in order to extract parallel lines. This is generally not the case for a person undergoing changes in posture as they walk through a scene.

In another example, a vertical vanishing point is found at the intersection of vertical lines joining corresponding head and feet locations of walking pedestrians at different locations in a video frame. In order to reduce errors due to changes in posture, this approach selects images with a fixed posture, the fixed posture corresponding to the moment at which the legs are closest to each other during a walking cycle. The fixed posture is determined based on the shape of segmented region of the walking person. A horizontal vanishing line is determined from pairs of different head and feet locations. Finally, the vertical vanishing points and horizontal vanishing line are used to compute the camera geometry. This approach relies on robust and accurate segmentation of the moving object in order to analyse the posture of the target. However, robust and accurate segmentation is a significant challenge in real surveillance scenarios with arbitrary background and lighting conditions.

In yet another example, camera geometry is estimated from a set of vertical lines estimated from the major axis of segmented regions of many walking pedestrians. In order to deal with errors due to changes in posture or poor segmentation, this approach uses RANSAC to find a subset of reliable vertical lines. The camera geometry is estimated from an inlier set of vertical lines and the known general distribution of heights of people in the population. Further robustness is achieved by computing the relative 3D height of lines in the inlier set, and discarding lines that fall outside a predetermined range. A drawback of this approach is that many vertical lines are required to find a reliable inlier set using RANSAC, which requires a crowded scene or video captured over an extended period.

SUMMARY

It is an object of the present invention to substantially overcome, or at least ameliorate, one or more disadvantages of existing arrangements.

Disclosed are arrangements, referred to by the present inventors as Regularised Object Orientation Estimation (ROOE) arrangements, which seek to address the above problems by determining a vertical vanishing point using regularised estimates of the orientation of a moving object.

One aspect of the present disclosure provides a method associated with a camera view of a moving-object in a scene, said method comprising: detecting and tracking the moving object over multiple video frames, estimating an orientation of the moving object in each of the video frames, constructing a cost map from the estimated orientations over the multiple video frames for finding a minimum cost path over the cost map, determining regularised orientation estimates of the moving-object from the minimum cost path, and locating the vanishing point of the camera view based on an axis of the moving-object from the minimum cost path, the axis formed using the regularised orientation estimates.

According to another aspect, the vanishing point is a vertical vanishing point and the formed axis is a vertical axis.

According to another aspect, the vanishing point is a horizontal vanishing point and the fanned axis is a horizontal axis.

According to another aspect, the method comprises estimating the orientation from a major axis of a foreground region of the moving object.

According to another aspect, the method further comprises estimating the orientation from a peak of a gradient orientation histogram over a bounding box associated with the object.

According to another aspect, the method comprises estimating the orientation from an axis of symmetry of a cost map determined over a bounding box associated with the object.

According to another aspect, the method further comprises rotating a graphical representation of the object to an upright location based on the vertical vanishing point.

According to another aspect, the method further comprises detecting a change in the vanishing point over a period of time to assess tamper of a camera imaging the scene.

According to another aspect, the method further comprises stabilising the video frames captured by a camera imaging the scene using the vertical vanishing point.

According to another aspect, an object in the camera is scene is identified in one video frame, the method further comprising re-identifying the object in a subsequent video frame based on a variation pattern of the regularised orientation estimate.

Another aspect of the present disclosure provides a non-transitory computer readable storage medium having a computer program recorded therein, the program being executable by a computer apparatus to make the computer perform a method associated with a camera view of a moving object in a scene, said program comprising: code for detecting and tracking the moving object over multiple video frames, code for estimating an orientation of the moving object in each of the video frames, code for constructing a cost map from the estimated orientations over the multiple video frames for finding a minimum cost path over the cost map, code for determining regularised orientation estimates of the moving-object from the minimum cost path, and code for locating the vanishing point of the camera view based on an axis of the moving-object from the minimum cost path, the axis formed by using the regularised orientation estimates.

Another aspect of the present disclosure provides a system, comprising a memory for storing data and a computer program; a processor coupled to the memory for executing said computer program, said computer program comprising instructions for: detecting and tracking the moving object over multiple video frames, estimating an orientation of the moving object in each of the video frames, constructing a cost map from the estimated orientations over the multiple video frames for finding a minimum cost path over the cost map, determining regularised orientation estimates of the moving object from the minimum cost path, and locating the vanishing point of the camera view based on an axis of the moving object from the minimum cost path, the axis formed using the regularised orientation estimates Apparatus for performing a method associated with a camera view of a moving object in a scene, said apparatus comprising: means for detecting and tracking the moving object over multiple video frames, means for estimating an orientation of the moving object in each of the video frames, means for constructing a cost map from the estimated orientations over the multiple video frames for finding a minimum cost path over the cost map, means for determining regularised orientation estimates of the moving object from the minimum cost path, and means for locating the vanishing point of the camera view based on an axis of the moving object from the minimum cost path, the axis formed using the regularised orientation estimates.

BRIEF DESCRIPTION OF DRAWINGS

At least one embodiment of the invention will now be described with reference to the following drawings, in which.

DETAILED DESCRIPTION INCLUDING BEST MODE

Context

Figure 1:
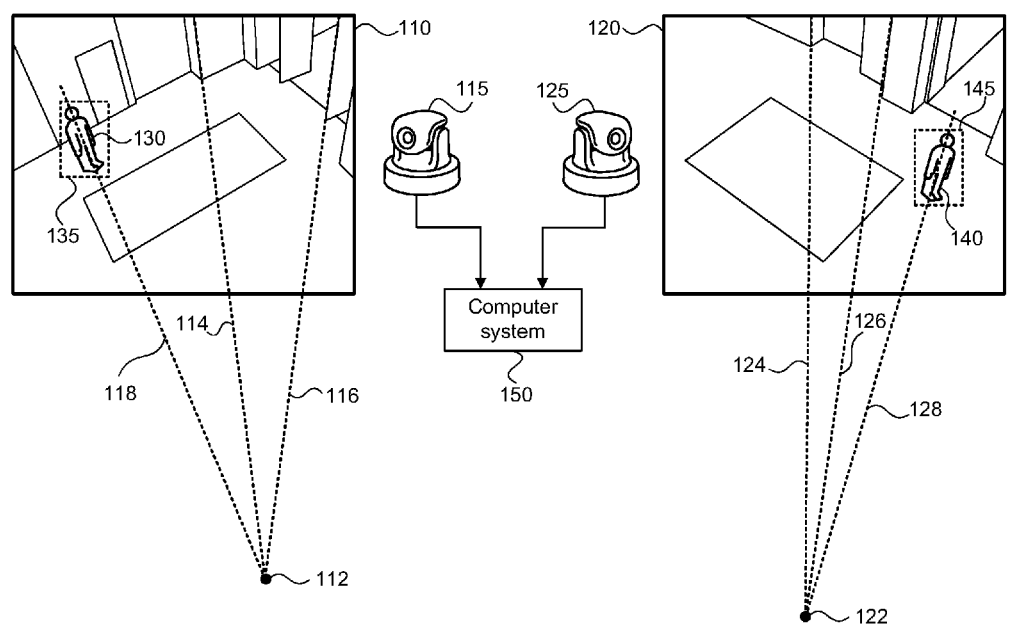
FIG. 1 is a schematic diagram illustrating the imaging of an object of interest captured by a first digital camera and the imaging of a candidate object captured by a second digital camera, to Which the presently described ROOE; arrangements may be applied.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as the image 110, is made up of visual elements. The terms "pixel", "pixel location" and "image location" are used interchangeably throughout this specification to refer to one of the visual elements in a captured image. Each pixel of an image is described by one or more values characterising a property of the scene captured in the image. In one example, a single intensity value characterises the brightness of the scene at the pixel location. In another example, a triplet of values characterise the colour of the scene at the pixel location. Furthermore, a "region" or "image region" in an image refers to a collection of one or more spatially adjacent visual elements. A "feature" or "appearance descriptor" represents a derived value or set of derived values determined from the pixel values in an image region. In one example, a descriptor includes a histogram of colour values in the image region. In another example, a descriptor includes a histogram of quantized image gradient responses (histogram of oriented gradients) in a region.

The term "edge" refers to the boundary between two different regions in a scene. An edge and a point are said to be "collinear" if they lie on the same line. It is a property of camera geometry that the image of a set of parallel edges in a scene are collinear with a single point in the image, known as a "vanishing point". A "vertical vanishing point" is a vanishing point collinear with the image of all vertical edges in the scene. In one example, with reference to FIG. 1, lines 114 and 116 align with vertical edges in a first image 110 and are collinear with and/or intersect to form a vertical vanishing point 112. In another example, lines 124 and 126 align with vertical edges in a second image 120 and are collinear with and/or intersect to form a vertical vanishing point 122.

A "vertical axis" of an object is a line that is parallel to the vertical direction in a scene and passes through the centre of the object. It is a property of camera geometry that the image of a vertical axis of an object in a scene is collinear with the vertical vanishing point for the image. As such, each image can have only one vertical vanishing point. In one example, the vertical axis 118 of the object 130 (a person) in the image 110 is collinear with the vertical vanishing point 112. In another example, the vertical axis 128 of the object 140 (a person) in the image 130 is collinear with the vertical vanishing point 122. The term "orientation" is used throughout this specification to refer to the attitude of the vertical axis of an object in an image.

The above notwithstanding, an image can have any number of other vanishing points. A vanishing point is that point associated with the image, due to capture geometry, where parallel lines in the captured scene meet. For example, a horizontal vanishing point can relate to all horizontal lines or surfaces in the scene, such as from flat roofed buildings, or elongate objects such as dogs, cats, some motor cars, trucks, and the like. Other vanishing points in other planes may be relevant, for example with respect to architectural buildings with non-vertical and non-horizontal surfaces and edges.

The present description provides a method and system for determining a vanishing point, particularly exemplified with a vertical vanishing point, using regularised estimates of the orientation of detected objects. FIG. 1 illustrates an exemplary use case to which ROOE arrangements may be applied. In this example, the goal is to determine whether a first object 130, observed in an image 110 of a first scene captured by a first digital camera 115, has the same identity as a second object 140, detected in an image 120 of a second scene captured by a second digital camera 125. The cameras 115 and 125 are connected to a computer system 150 to which ROOE arrangements may be applied. ROOE arrangements may equally be applied when the images are captured by different cameras simultaneously or at different times, or captured by the same camera at different times, including images that represent the same scene, or different scenes, obtained for example using pan, tilt and zoom control of the camera.

In one known approach to this problem, a first appearance descriptor for the first object 130 is extracted from a corresponding image region 135, and a second appearance descriptor for the second object 140 is extracted from a corresponding image region 145. A similarity score is computed based on the first and second appearance descriptors. The first and second objects are assumed to have the same identity if the descriptors are assessed as being sufficiently similar.

Even if the first object 130 and second object 140 have the same identity (i.e. the same person was captured in each image 110 and 120), the appearance descriptors may not be sufficiently similar to correctly match the objects. This is because the vertical axis 118 of the object in the first image 110, and the vertical axis 128 of the object in the second image 120 can, and typically have, different orientations. As will be described later, knowledge of the vanishing points 112 and 122 can be used to rectify the images of the objects to a canonical orientation. After rectification, the appearance descriptors may have greater similarity if the objects have the same identity.

As illustrated in FIG. 1, the digital cameras 115 and 125 communicate with a computer system 150. This exemplary ROOE arrangement can be applied to a range of applications. In one example, the computer system 150 allows a security guard to select an object of interest through an interactive user interface, and returns images of one or more candidate objects determined to be the object of interest. In another example, the computer system 150 is configured to automatically select an object of interest and matches the object across multiple distributed cameras in order to analyse the long-term behaviour of the object.

Overview

Figure 3:
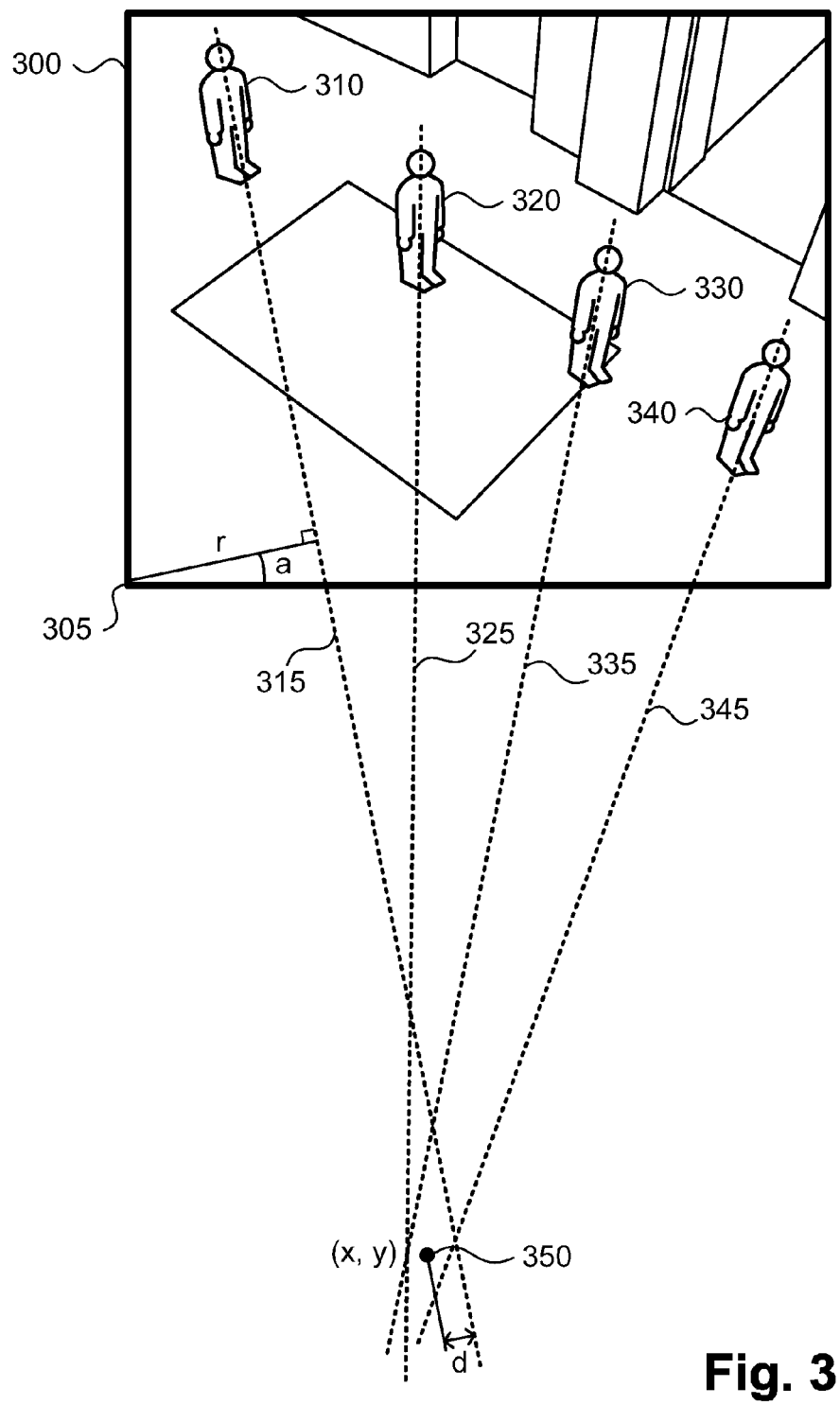
FIG. 3 illustrates an example of determining a vanishing point from regularized orientations of a moving object according to one ROOE arrangement.

FIG. 3 illustrates a means of determining a vertical vanishing point in a camera view in respect to a moving object, according to one ROOE arrangement. As noted above, the vertical axis of an object in a scene is collinear with the vertical vanishing point. Thus, the vertical vanishing point may be determined as the co-intersection of a set of lines along the vertical axis of an object in at least two different locations in the camera view. For the example shown in FIG. 3, the set of lines comprises 315, 325, 335 and 345, corresponding to the vertical axis of the object at four locations 310, 320, 330 and 340 in a imaged scene 300 (for example, obtained by four captured frames each imaging the same scene, in which the object is moving across the scene). Each line is parameterized by a distance between an origin of the image coordinate frame and the closest point on the line, and an angle between the horizontal axis of the image frame and a line perpendicular to the vertical axis of the object. For the example shown in FIG. 3, the line 315 is parameterized by the perpendicular distance "r" between the line 315 and the image origin 305, and the angle "a" to the horizontal axis of the image.

Since the observed vertical axes are measured in the presence of noise, the vertical axes typically do not intersect at a single common co-intersection point. Under these conditions, it is necessary to estimate the vertical vanishing point as a location of best fit that minimizes a residual error with respect to the noisy vertical axes. In one ROOE arrangement, the residual error is the sum of the squared distances between the location of best fit and the closest point on each vertical axis. For the example in FIG. 3, the distance between the location of best fit 350, represented by the horizontal coordinate "x" and vertical coordinate "y", and the line 315 is "d", which is computed from "r", "a", "x" and "y" as (r−x. cos(a)−y. sin(a)). The location of best fit is thus given by the "Minimum Residual Equation" in accordance with Equation (1) as follows:

$$(x, y) = \mathrm{argmin}_{(x', y')} \Sigma_i (r_i - x' \cos a_i - y' \sin a_i)^2 \quad (1)$$

where the summation in Equation (1) is taken over all observed vertical axes. Even when the vertical vanishing point is estimated using Equation (1), the estimate may be far from the true vanishing point. This is especially true when the vertical vanishing point is far from the origin of the image frame, in which case the co-intersection of the vertical axes is ill-conditioned.

The present description relates to a method to regularise the estimated vertical axes and therefore suppress noise, so that the estimated vertical vanishing point is close to the true vertical vanishing point. The regularization is based on the temporal and spatial continuity of the orientation of the vertical axis of a moving object in a video sequence. Spatial continuity implies that the difference in orientation of the vertical axis decreases for locations of the object that are closer in the camera view. Temporal continuity implies that the location of a moving object is closer in adjacent frames compared to frames separated by a large temporal gap. Together, spatial and temporal continuity imply that the vertical axis of a moving object varies smoothly across adjacent frames in the video sequence. For the example shown in FIG. 3, the angle "a" of the vertical axis decreases smoothly as the object moves from location 310 to location 340.

The regularized orientations are determined by imposing a smoothness constraint on the observed orientations in adjacent frames of a video sequence of a moving object. In one ROOE arrangement, the smoothness constraint is implemented by constructing a cost map from the estimated orientations, in which the estimated orientation in adjacent frames is represented in adjacent rows of the cost map, and finding a minimum cost smooth path spanning the rows of the cost map. The regularized orientations are used to determine a set of regularized vertical axes and estimate a vertical vanishing point at a location of best fit according to Equation (1). Details, examples and alternative implementations for determining a vertical vanishing point from regularized orientations of a moving object are described later.

Embodiments (with Examples and Alternatives)

Figure 2A:
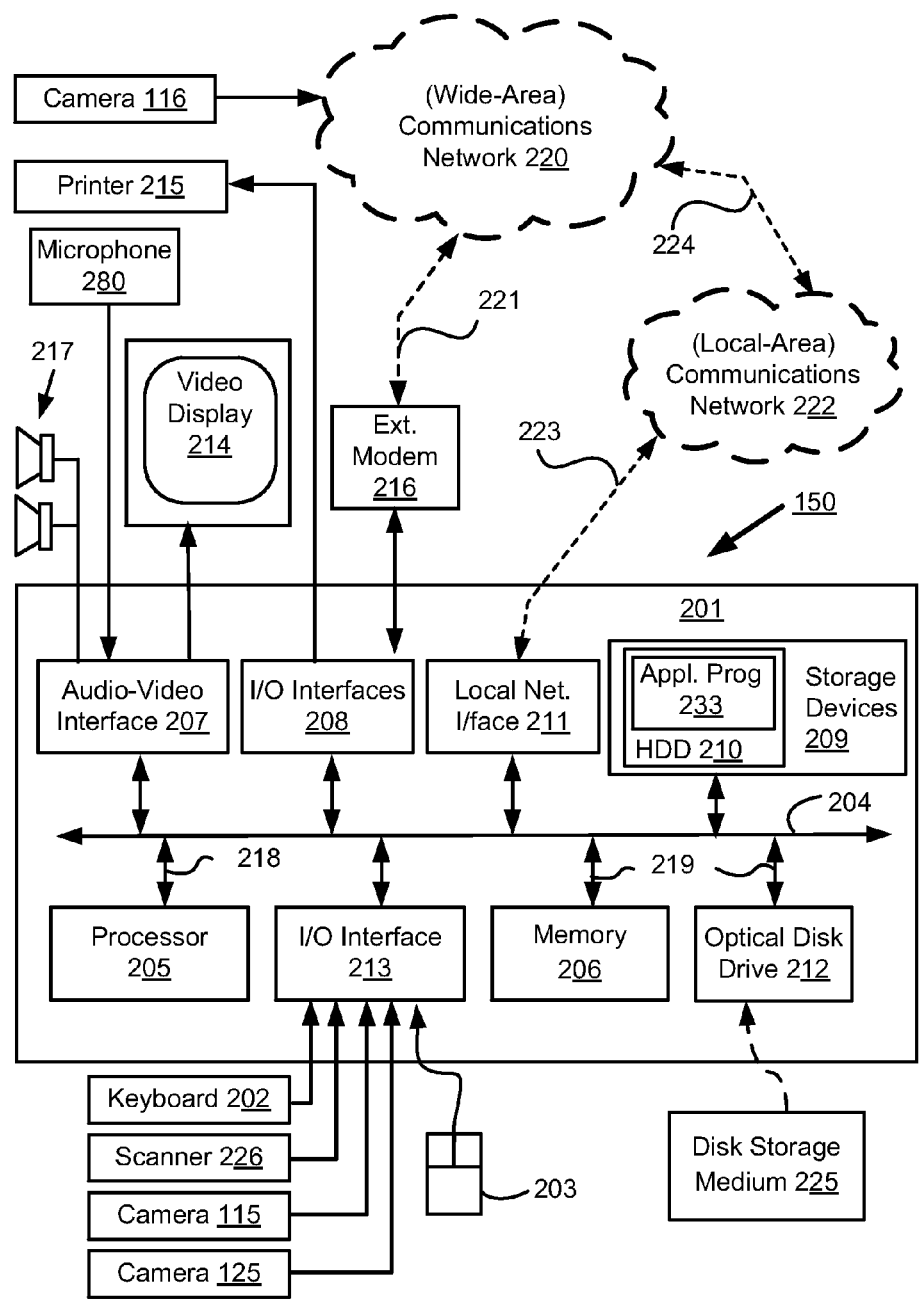
FIGS. 2A and 2B collectively form a schematic block diagram of a general purpose computer system upon which ROOE arrangements described can be practiced.
Figure 2B:
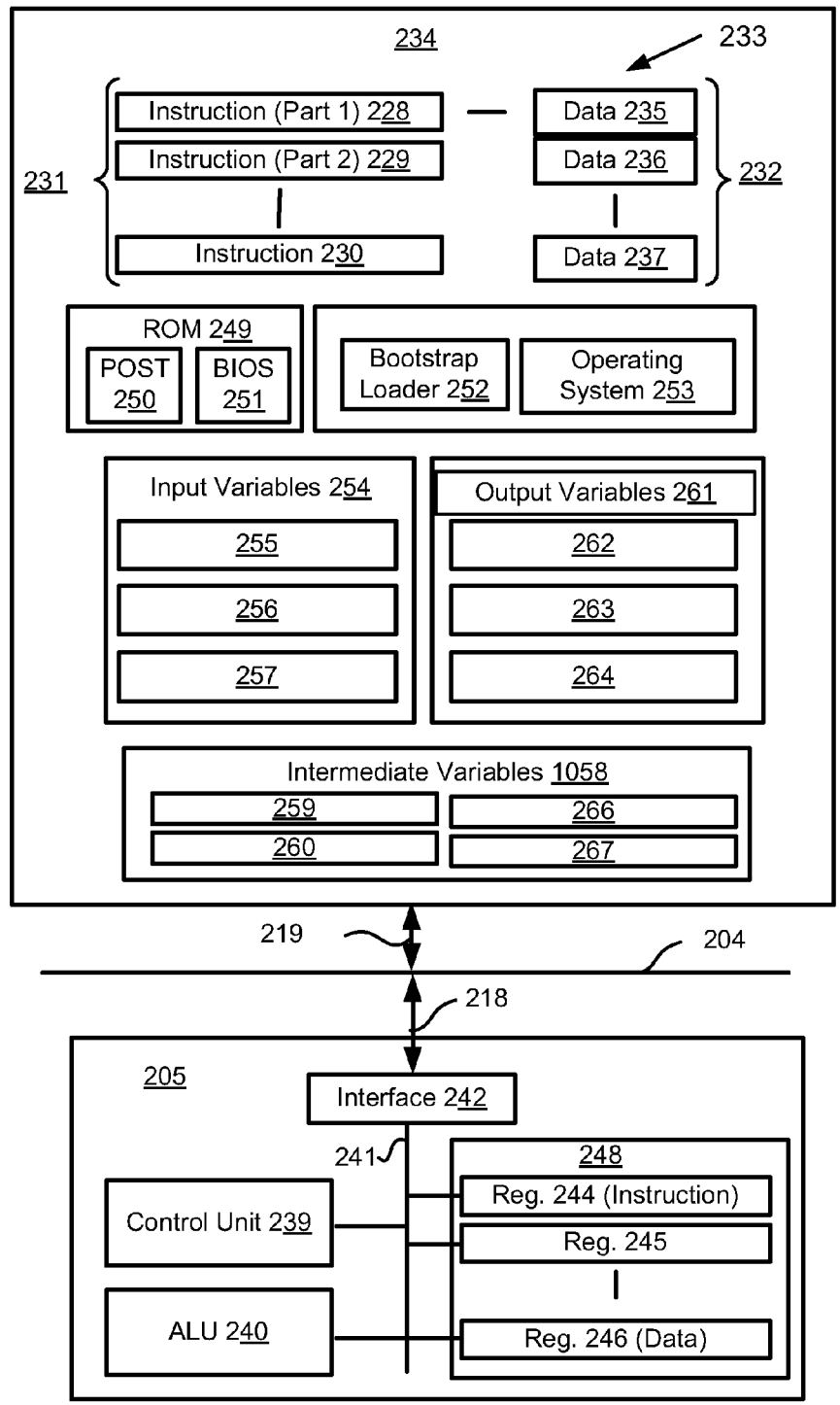

FIGS. 2A and 2B depict a general-purpose computer system 150, upon which the various ROOE arrangements described can be practiced.

As seen in FIG. 2A, the computer system 150 includes: a computer module 201; input devices such as a keyboard 202, a mouse pointer device 203, a scanner 226, one or more cameras such as the cameras 115 and 125, and a microphone 280; and output devices including a printer 215, a display device 214 and loudspeakers 217. An external Modulator-Demodulator (Modem) transceiver device 216 may be used by the computer module 201 for communicating to and from remote cameras such as 116 over a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 115 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 150 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 150.

The components 205 to 213 of the computer module 201 typically communicate via an interconnected bus 204 and in a manner that results in a conventional mode of operation of the computer system 150 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The ROOE method may be implemented using the computer system 150 wherein the processes of FIGS. 4, 5, 7A, 8 and 9, to be described, may be implemented as one or more ROOE software application programs 233 executable within the computer system 150. In particular, the steps of the ROOE method are effected by instructions 231 (see FIG. 2B) in the software 233 that are carried out within the computer system 150. The software instructions 231 may be formed as one or more code modules, each for performing one or more particular tasks. The software may also be divided into two separate parts, in which a first part and the corresponding code modules performs the ROOE methods and a second part and the corresponding code modules manage a user interface between the first part and the user.

The ROOE software may be stored in a computer readable medium, including the storage devices described below, for example. The software is loaded into the computer system 150 from the computer readable medium, and then executed by the computer system 150. A computer readable medium having such software or computer program recorded on the computer readable medium is a computer program product. The use of the computer program product in the computer system 150 preferably effects an advantageous apparatus for implementing the ROOE method.

The software 233 is typically stored in the HDD 210 or the memory 206. The software is loaded into the computer system 150 from a computer readable medium, and executed by the computer system 150. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 150 preferably effects an apparatus for practicing the ROOE arrangements.

In some instances, the ROOE application programs 233 may be supplied to the user encoded on one or more CD-ROMs 225 and read via the corresponding drive 212, or alternatively may be read by the user from the networks 220 or 222. Still further, the software can also be loaded into the computer system 150 from other computer readable media. Computer readable storage media refers to any non-transitory tangible storage medium that provides recorded instructions and/or data to the computer system 150 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 150 and the application may manipulate the interface in a functionally adaptable manner to provide controlling commands and/or input, to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 150 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 150 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The ROOE application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed ROOE arrangements use input variables 254, which are stored in the memory 234 in corresponding memory locations 255, 256, 257. The ROOE arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 7A, 8 and 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The ROOE method may alternatively be implemented in dedicated hardware such as one or more integrated circuits performing the ROOE functions or sub functions. Such dedicated hardware may include graphic processors, digital signal processors, or one or more microprocessors and associated memories, and may reside on platforms such as video cameras.

Figure 4:
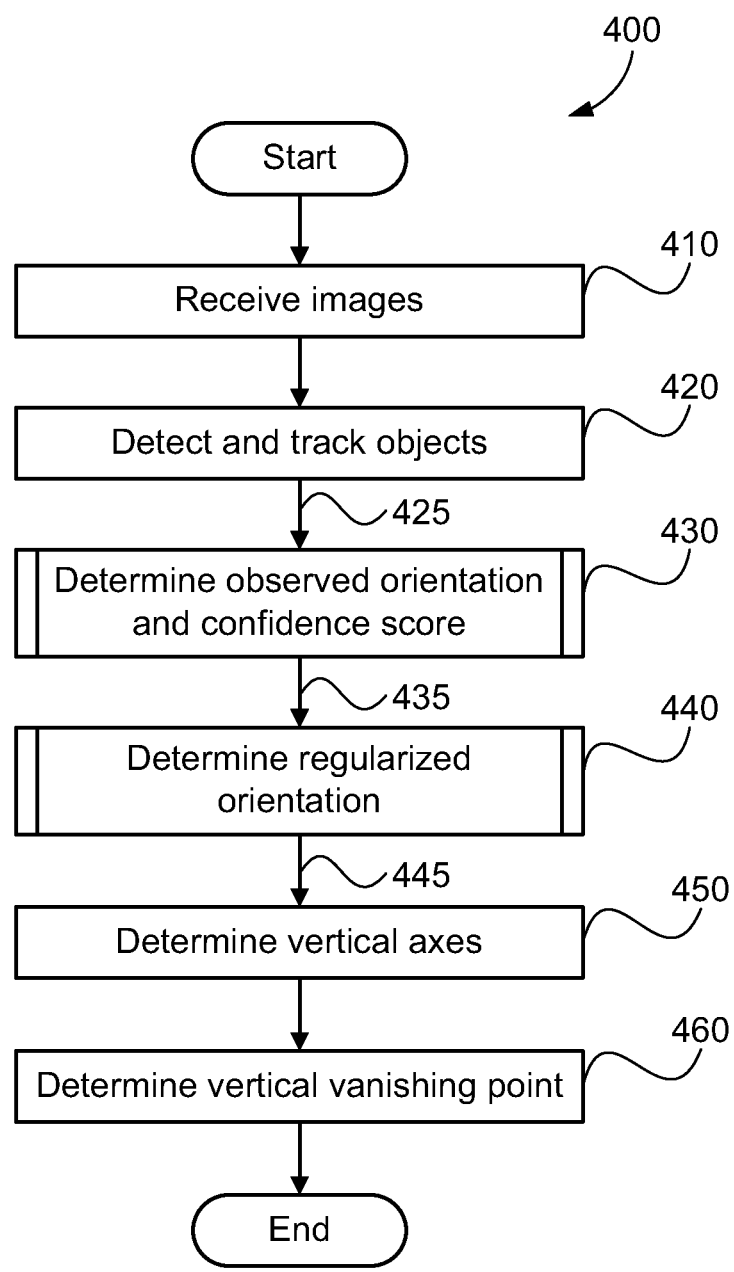
FIG. 4 is a schematic flow diagram illustrating a method of determining a vanishing point in an image according to one ROOE arrangement.

FIG. 4 shows a method 400 for locating a vertical vanishing point of a camera view from a moving object in the scene, according to one ROOE arrangement. The method 400 may be implemented as one or more software code modules of the software application program 233 resident in the hard disk drive 210 and being controlled in its execution by the processor 205. The following description provides details, examples and alternative implementations for the main steps of method 400. Further details, examples and alternative implementations of steps 420 and 440 are described later.

The method 400 starts at receiving step 410, wherein a video sequence including multiple video frames (images) of an object moving in a camera view is received as input. Control then passes from step 410 to detecting step 420 wherein objects are detected and tracked in each image of the video sequence received as input in step 410. In one ROOE arrangement, the object is detected at the step 420 by performing foreground separation using a statistical background pixel modelling (background subtraction) method, such as Mixture of Gaussian (MoG), wherein the background model is maintained over multiple frames with a static camera. In another ROOE arrangement, a foreground separation method is performed on Discrete Cosine Transform blocks in the images. In yet another ROOE arrangement, a foreground separation is performed on an unsupervised segmentation of the image, for example using superpixels. In yet another ROOE arrangement, the objects are detected using a supervised machine learning method, such as an object detector (e.g. pedestrian detection algorithms). The object detector classifies an image region as containing a known type of object or not based on a set of exemplar images of the known type of object. In yet another ROOE arrangement, the objects are detected using a head detection method. In still yet another ROOE arrangement, at least one object is manually detected through a graphical user interface. In one example, a user selects an object by drawing a rectangle around the object in an image. The output of detection step 420 is a set of bounding boxes 425 for the moving object at different locations in the camera view.

In sonic scenes, more than one object is detected at step 420. In one implementation of step 420, object detection is followed by performing object tracking on the detected objects in order to associate observations of the same object over multiple frames. For example, naïve tracking can be performed by assuming Brownian motion and associating a detected object in one frame to the detected object at the nearest image location in a previous frame. In another example, tracking can be performed by estimating the motion of the object using a recursive Bayesian filter such as a Kalman filter or particle filter. In still another example, tracking is performed using appearance information about the object in addition to positional and velocity information.

Control then passes from step 420 to an observed orientation determining step 430, where the observed orientation of a detected object is determined by execution of the program 233 by the processor 205 along with an associated confidence score indicating the uncertainty in the observed orientation. In one ROOE arrangement, the orientation is determined from a major axis of a foreground region of the object. The major axis may be of an ellipse fitted to a foreground segmentation of the object, and the confidence is determined from the aspect ratio of the ellipse, as will be described later with reference to the method 500 in FIG. 5.

Figure 10A:
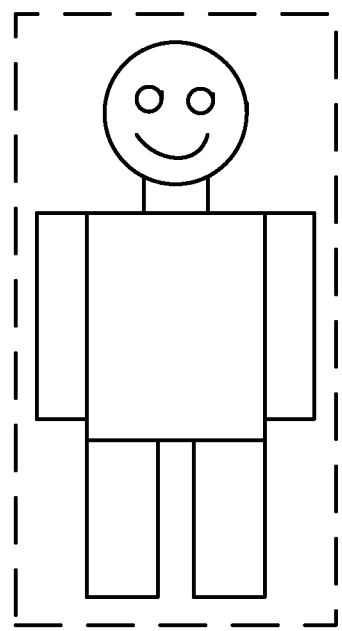
FIGS. 10A and 10B illustrate examples of a tight crop bounding box.
Figure 10B:
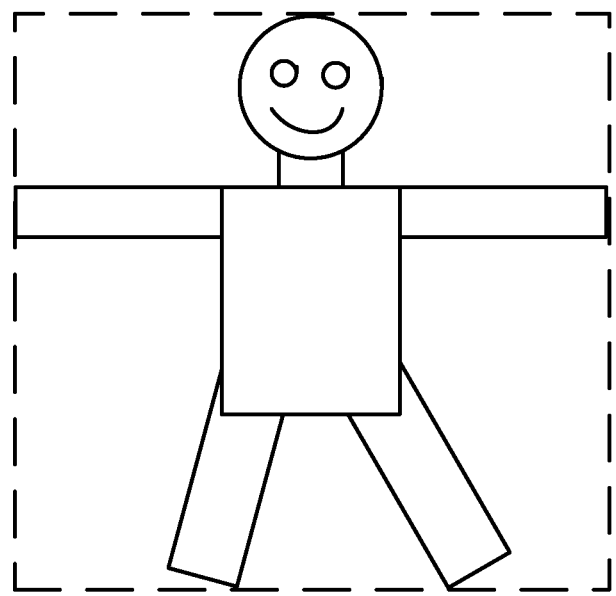

In another ROOE arrangement, a cost map is computed for an object as the auto-correlation of each row of pixels in a bounding box containing the object with a horizontally flipped version of the same row of pixels. Then, an observed orientation is computed as the slope of a line of best fit to the maxima of each row in the cost map. If the row of pixels is symmetric, when such is flipped and the two are correlated, the row will reveal a significant peak at the axis of symmetry of the object at that row of pixels. The bounding box can generally be considered to form a "tight crop" where the object occupies a substantial portion of the bounding box, for example more than 50% of the region defined by the bounding box. In an alternative, a tight crop can be where the bounding box touches the object of interest, at all edges, thereby forming the smallest bounding box. In such a case, the object need not occupy more than 50% of the area. Examples of each of these are illustrated in FIGS. 10A and 10B, respectively. Bounding boxes are generally seen for example in FIG. 1 with respect to the regions 135 and 145 and the respective objects 130 and 140. In a variation to this ROOE arrangement, a regularized vertical axis of symmetry is determined by finding a minimum cost path from the top row to the bottom row of the cost map. The observed orientation is computed from the slope of a line of best fit to the regularized vertical axis of symmetry. The confidence score can then be determined as the reciprocal of the residual error of the line of best fit.

In yet another ROUE arrangement, an image gradient orientation is determined at each pixel within a bounding box, based on the response of edge filters at multiple orientations. One example of an edge filter is a Sobel operator. With such an approach, the orientation can be estimated from the peak of a gradient orientation histogram over a tight crop of the object. Another example of an edge filter is a Gabor filter. Practitioners in the art will recognize that alternative methods to determine an image gradient orientation may equally be practiced.

In a preferred implementation of step 430, a histogram of image gradient orientations is formed by counting the number of pixels with an image gradient orientation that fall within pre-defined orientation bins. In one example, the histogram is quantized into orientation bins of size one degree. Finally, the observed orientation is determined as the orientation associated with the peak in the gradient orientation histogram. The confidence score is determined as the reciprocal of the entropy of the gradient orientation histogram.

The output of the orientation estimation step 430 is an orientation and confidence score 435 representing an estimated orientation for the detected object in every frame of the video sequence. Details, examples and alternative implementations of a preferred method 500 for estimating an orientation and confidence score, as may be implemented for the orientation estimation step 430 of method 400, will be described later with reference to FIGS. 5, 6A and 6B.

The method 400 then proceeds from step 430 to a regularized orientation determining step 440, which determines a regularized orientation of an object based on an observed orientation and confidence score 435. In one ROOE arrangement, step 440 constructs a score cost map from the observed orientation and confidence score 435 of all objects detected at step 420, and determines a minimum cost path on the score cost map. The output of the regularized orientation determining step 440 is a regularised orientation 445, being an estimate of the true orientation of the detected object in each considered frame of the video sequence. Further details, examples and alternative implementations of a method 700 for determining a regularized orientation of an object, as applied to the regularized orientation determining step 440 of method 400, will be described later with reference to FIGS. 7, 8A and 8B.

The method 400 then proceeds from step 440 to a vertical axes determining step 450, wherein a vertical axis is determined for an object detected at step 420. In one ROOE arrangement, a vertical axis is determined as a line passing through the centre of the bounding box (e.g. tight crop) associated with the object, in the direction of the regularized orientation 445 of the object. In another ROOE arrangement, a vertical axis is determined as a line passing through the centroid of a foreground region of the object, in the direction of the regularized orientation 445 of the object. The foreground region of the object is determined using processes well-known and shared with the detecting step 420. The output of the vertical axes determining step 450 is a vertical axis of the object for every frame of the video sequence.

The method 400 then proceeds from step 450 to a vanishing point determining step 460, which determines a location of a vertical vanishing point in the camera view from a co-intersection point (e.g. 350) of the vertical axes determined at step 450. In one ROOE arrangement, the vertical vanishing point determined at step 460 is determined as the image location with the minimum total distance to all vertical axes, for example according to the "Minimum Residual Equation" in accordance with Equation (1), found using the method of least squares.

In another ROOE arrangement, the vertical vanishing point is estimated using RANdom Sample Consensus (RANSAC). In this arrangement, a candidate vertical vanishing point is proposed by determining the intersection of a randomly selected pair of constructed (vertical) lines (e.g. 315 and 325))). A score is assigned to the candidate vertical vanishing point by counting the number of inlier constructed lines from all detected objects with a distance to the candidate vertical vanishing point less than a pre-determined threshold distance. One example of a pre-determined threshold distance is 10% of the width of the image. The steps of proposing a candidate vertical vanishing point from randomly selected pairs of lines and assigning a score by counting the inlier lines are repeated for a fixed number of iterations over different pairs of lines). One example of a fixed number of iterations is 10. Finally, the candidate vanishing point with the highest score is selected as the vertical vanishing point.

In another ROOE arrangement, a vertical vanishing point is estimated by applying the method of least squares described above to all lines in the inlier set of constructed lines associated with the candidate vanishing point with the highest score after a fixed number of RANSAC iterations.

Practitioners in the art will recognize that alternative implementations of step 460 that determine the point closest to a set of lines may equally be practiced, wherein the point is a vertical vanishing point and each line is in the direction of the regularized orientation 445 and passes through the centroid of an object detected at step 420. Method 400 concludes after completing the vanishing point determining step 460.

Figure 5:
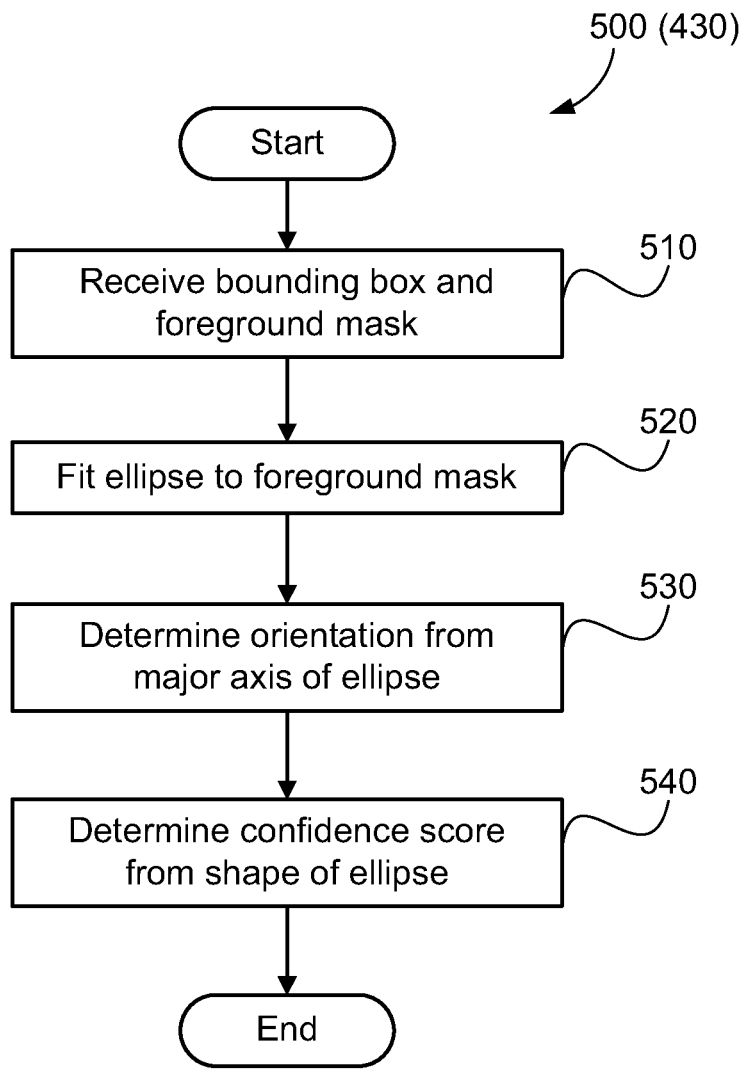
FIG. 5 is a schematic flow diagram illustrating a method of determining an orientation and confidence score as used in the method of FIG. 4.
Figure 6A:
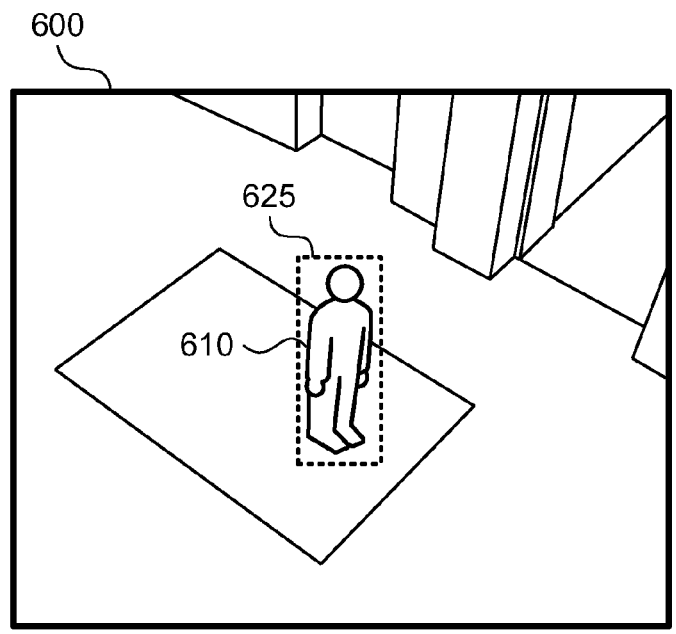
FIGS. 6A and 6B collectively illustrate an example of detecting an orientation and confidence score for an object of interest in a scene as in the method of FIG. 5.

A preferred method 500 to determine an observed orientation and confidence score for an observed object, as executable for step 430 of method 400, will now be described with reference to FIG. 5. The method 500 may be implemented as one or more software code modules of the software application program 233 resident in the hard disk drive 210 and being controlled in its execution by the processor 205. Method 500 starts at the retrieving step 510, wherein a bounding box and foreground mask of an object determined at step 420 of method 400, are received as input. In one example, illustrated in FIGS. 6A and 6B, the method 500 is applied to an object 610 in an image 600, and the processor 205 executing step 510 receives the bounding box 625 and the foreground mask 620 as input.

Figure 6B:
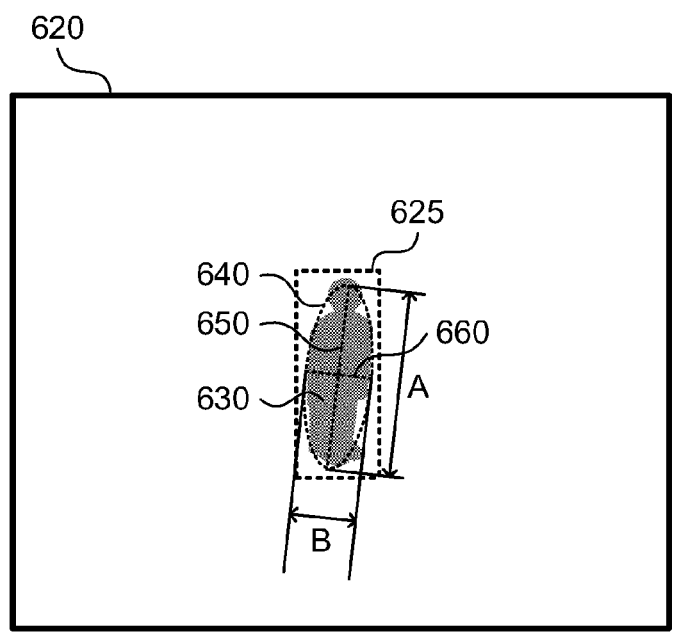

Control then passes from step 510 to ellipse fitting step 520, in which the processor 205 operates to fit an ellipse 640 to a foreground region 630 within the bounding box 625 of the mask 620. The "major axis" of the ellipse is a line passing through the centre of the ellipse touching the farthest points on the circumference, and the "minor axis" of the ellipse is the line passing the centre of the ellipse touching the closest points on the circumference. As shown in FIG. 6B, the major axis of ellipse 640 is the line 650 of length A, and the minor axis of ellipse 640 is the line 660 of length B.

In one ROOE arrangement, the ellipse is fitted to the pixels at the boundary of the foreground region 630 using the method of least squares. In another ROOE arrangement, the ellipse is determined by applying Principal Component Analysis (PCA) to all the pixels in the foreground region 630. The directions of the major and minor axes are taken as the directions of the first and second principal components respectively. The length of the major axis is computed by projecting the foreground pixel locations onto the major axis and computing the root of the average squared distance of the projected pixel locations from the centre of the ellipse. Similarly, the length of the minor axis is computed by projecting the foreground pixel locations onto the minor axis and computing the root of the average squared distance of the projected pixel locations from the centre of the ellipse. Practitioners in the art will recognize that alternative methods to fit an ellipse to a foreground region may equally be practiced.

The method 500 then proceeds from step 520 to an orientation determining step 530, which determines the orientation of an object. The input to step 530 is the ellipse fitted to the foreground region at step 520. In one ROOE arrangement, the orientation of the object is taken as the orientation of the major axis of the fitted ellipse. For the example in FIGS. 6A and 6B, the orientation of the object 610 is taken as the orientation of the major axis 650 of the ellipse 640 fitted to the foreground region 630. The orientation may be expressed as an angle relative to an axis of the image frame.

The method 500 then proceeds from step 530 to the confidence determining step 540, which determines the degree of certainty in the observed orientation of an object. The input to step 540 is the ellipse fitted to the foreground region at step 520. Implementations of step 540, for example applicable to human detection, assign a higher confidence score to an elongated ellipse and a lower confidence score to an ellipse resembling a circle, since the orientation of an elongated ellipse is well-conditioned and the orientation of a circle is ill-conditioned. In one ROOE arrangement, the confidence score is computed as the eccentricity of the ellipse. In another ROOE arrangement, the confidence score is computed as (A–B)/A, where A is the length of the major axis and B is the length of the minor axis. Practitioners in the art will recognize that alternative methods to compute a confidence score based on a measure of the elongation of an ellipse may equally be practiced.

Method 500 concludes after completing the confidence determining step 540. Steps 530 and 540 may be swapped in their order of implementation in the method 500.

Figure 7:
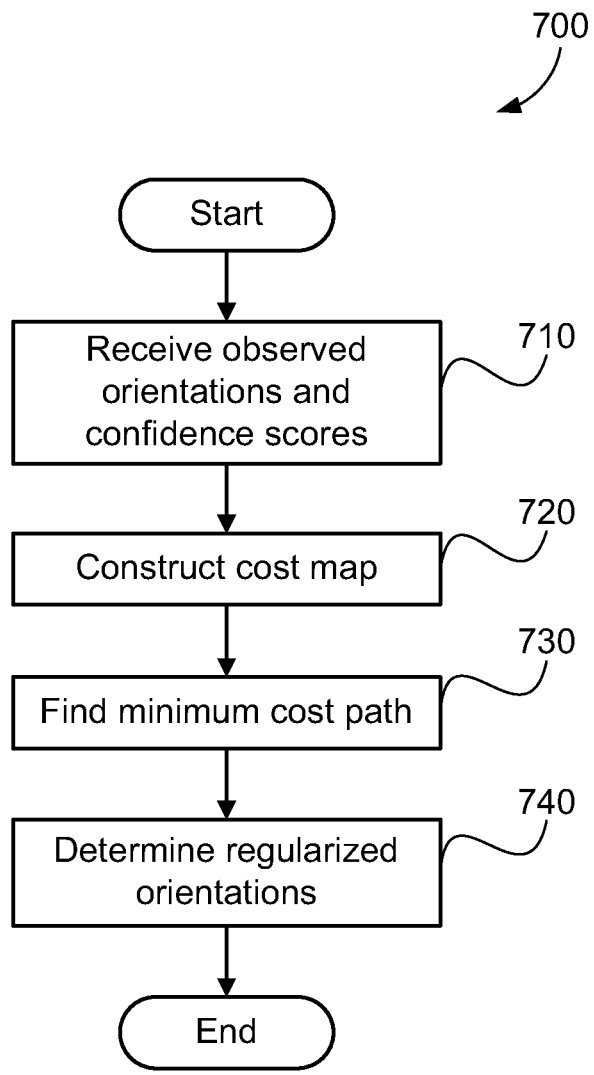
FIG. 7 is a schematic flow diagram illustrating a method of determining regularized orientations as used in the method of FIG. 4.
Figure 8A:
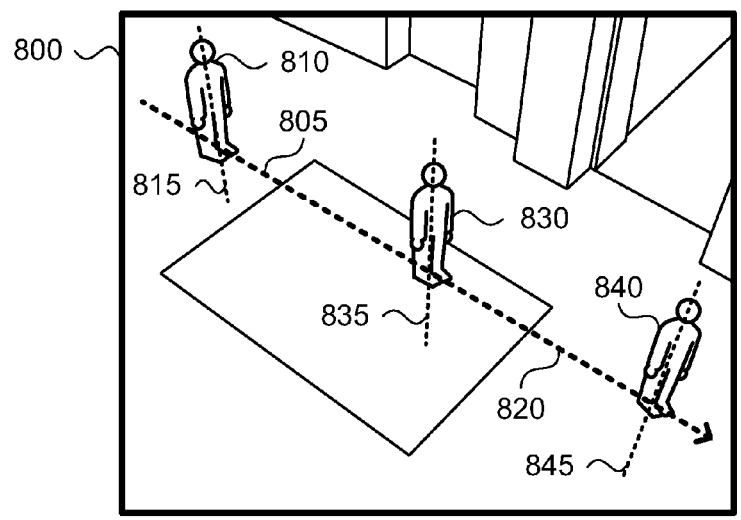
FIGS. 8A and 8B collectively illustrate an example of constructing a cost map and finding a minimum cost path as used in the method of FIG. 7.
Figure 8B:
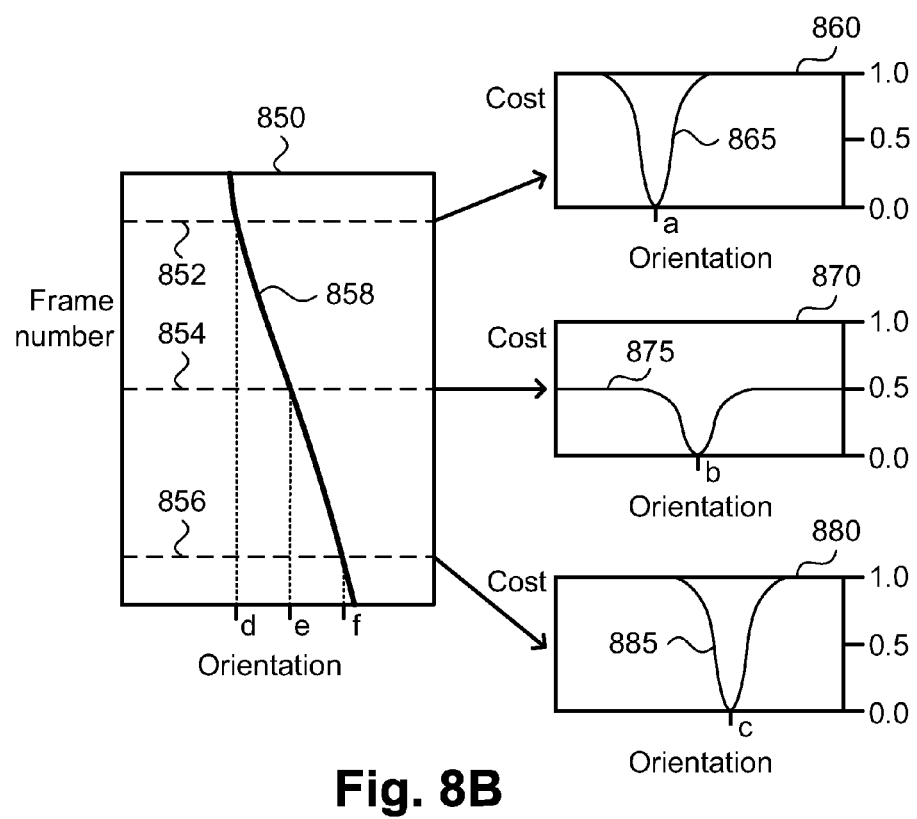

A preferred method 700 to determine a regularized orientation of an object, as executable in an implementation of step 440 of method 400, will now be described with reference to FIG. 7. The method 700 may be implemented as one or more software code modules of the software application program 233 resident in the hard disk drive 210 and being controlled in its execution by the processor 205. Method 700 starts at the retrieving step 710, wherein the observed orientations and confidence scores determined at step 430 of method 400 are received as input. In one example illustrated in FIG. 8A, the method 700 is applied to an object detected at locations 810, 830 and 840 while moving along a path 820 in a camera view 800. In this example, step 710 receives as input the orientation of the vertical axes 815, 835 and 845 and the confidence scores associated with these vertical axes.

Control then passes from step 710 to constructing step 720, which constructs a cost map based on the received orientation and confidence scores. The constructing step 720 will be described by way of example with reference to FIG. 8B. The cost map is a two-dimensional array of values 850 where each column represents an orientation angle of a vertical axis of an object and each row represents a frame in the video sequence received at step 410 of method 400. The frames of the video sequence as processed need not be successive, but should be sequential, for example every fifth frame may be selected for processing. The rows are arranged so that adjacent frames in the video sequence are represented by adjacent rows of the cost map 850. For example, row 852 in the cost map 850 represents the frame in which the vertical axis 815 was detected. The adjacent row 854 represents the next frame in the video sequence in which the vertical axis 835 was detected. Similarly, the adjacent row 856 represents the frame in which the vertical axis 845 was detected.

The values in each row represent a cost associated with each potential orientation of the object used to determine the regularised orientation. In one ROOE arrangement, a cost curve is constructed as an inverted Gaussian with a cost of 0.0 at the observed orientation. For the example in FIGS. 8A and 8B, wherein the vertical axes 815, 835 and 845 have observed orientations "a", "b" and "c" respectively, the corresponding cost curves 865, 875 and 885, corresponding to rows 852, 854 and 856 of the cost map 850, are inverted Gaussians with a value of 0.0 at "a", "b" and "c" respectively. In one ROOE arrangement, the standard deviation and maximum value of the inverted Gaussian are set to fixed values. In one example, the standard deviation is fixed to 10 degrees and the maximum value of the inverted Gaussian is fixed to 1.0. In another ROOE arrangement, the standard deviation is inversely proportional to the confidence score associated with the observed orientation. In yet another ROOE arrangement, the maximum value of the inverted Gaussian is proportional to the confidence score associated with the observed orientation. For the example in FIGS. 8A and 8B, wherein the vertical axis 815 of the first object 810 has a confidence score of 1.0 and the vertical axis 835 of a second object 830 has a confidence score of 0.5, the associated inverted Gaussian cost curves 865 and 875 have maximum values of 1.0 and 0.5 respectively.

The method 700 then proceeds from step 720 to path determining step 730, which determines a smooth minimum cost path over the rows of the cost map 850 determined at step 720. A path over the rows of the cost map comprises a single orientation value selected at each row of the cost map 850. A smooth path is one in which the difference between the selected orientation in adjacent rows is sufficiently small (e.g. below a predetermined amount). One example of a threshold for a sufficiently small difference is one degree. The total cost of a path is the accumulated value of the cost map integrated over the path. A smooth minimum cost path is therefore able to be determined as the smooth path with the lowest total cost from among all possible smooth paths over the cost map. This path can be determined by a numerical search over the space of smooth paths. In another ROOE arrangement, dynamic programming is used to search the space of smooth paths to find the minimum cost path. Practitioners in the art will recognize that alternative optimization methods to search for a smooth minimum cost path in the cost map constructed at step 720 may equally be practiced. Examples include but not limited to A-star algorithm and wavefront propagation.

The method 700 then proceeds from step 730 to orientation determining step 740, which determines regularized orientations from the smooth minimum cost path determined at step 730. In one ROOE arrangement, the regularized orientation of the object in a given frame of the video sequence is determined as the orientation of the smooth minimum cost path at the corresponding row of the cost map. For the example in FIG. 8B, wherein the curve 858 is the minimum cost path in the cost map 850, the regularized orientations are determined by the intersections of the curve 858 with the rows 852, 854 and 856 of the cost map. Thus, the regularized orientation of the object at location 810 in the camera view 800 is "d", the regularized orientation at location 830 is "e" and the regularized orientation at location 840 is "f". Method 700 concludes after completing the orientation determining step 740.

Applications

As illustrated in FIG. 1, ROOE arrangements in the present description can be applied to the problem of analysing the appearance or behaviour of an object in a surveillance camera network. Knowledge of the vertical vanishing point in a camera view can be used to rectify the image of an object to a canonical orientation. One example of a canonical orientation is an upright orientation, wherein the vertical axis of the object is parallel to the vertical axis of the image coordinate frame. Rectifying an object before extracting an appearance descriptor can improve the repeatability of extracted image features by reducing variations due to the particular viewpoint of a camera. In one ROOE arrangement, the images of two objects observed in two camera views are rectified based on vertical vanishing points determined according to method 400. Appearance descriptors are then extracted from the rectified images and compared in order to determine whether the objects have the same identity.

In another ROOE arrangement, the images of an object in a video sequence are rectified based on a vertical vanishing point according to method 400. Features extracted from the rectified images in the video sequence are used to classify the behaviour of the object as suspicious or not.

Figure 9:
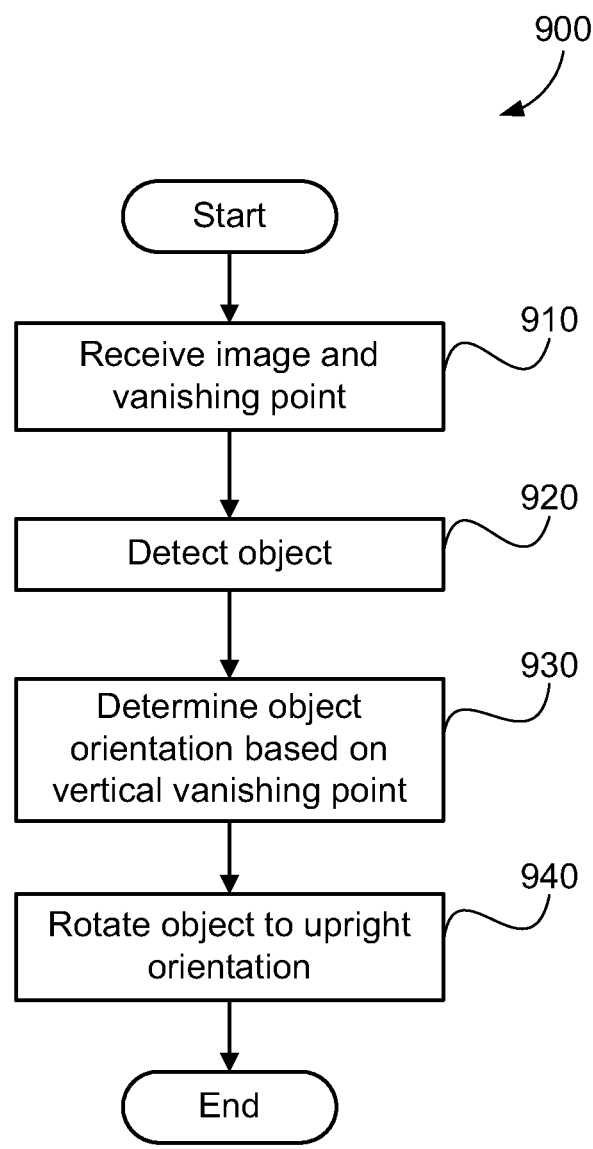
FIG. 9 is a schematic flow diagram illustrating a method of rotating an object to an upright orientation according to one ROOE arrangement.

A method 900 to rectify an image of an object to an upright orientation based on a vertical vanishing point, as utilised in the applications described above, will now be described with reference to FIG. 9. The method 900 may be implemented as one or more software code modules of the software application program 233 resident in the hard disk drive 210 and being controlled in its execution by the processor 205. Method 900 starts at the retrieving step 910, wherein an image of an object and a vertical vanishing point, as determined by one embodiment of method 400, are received as input. In the example illustrated in FIG. 1, the method 900 is applied to the object 130 in the image 110, and step 910 receives the image 110 and the vertical vanishing point 112 as input.

The method 900 then proceeds from step 910 to detecting step 920, which detects the object in the image. Detecting step 920 of method 900 can in some implementations share operation with, or be sourced from, the detecting step 420 of method 400, where a graphical representation of the object is detected, as well known.

The method 900 then proceeds from step 920 to orientation determining step 930, wherein an orientation of the object is determined based on the vertical vanishing point received at step 910. In one ROOE arrangement, the orientation of the object is computed as the orientation of a line joining a centroid of the object to the vertical vanishing point. One example of a centroid of an object is the centre of a bounding box containing the object as determined at step 920. Another example of a centroid of an object is the centre of mass of pixel locations in a foreground mask detected at step 920. Practitioners in the art will recognize that alternative measures of the centroid of a detected object may equally be used.

Control then passes from step 930 to a rotating step 940, wherein the object is rotated to an upright orientation. Generally this involves rotating the graphical representation of the object, such as the image within the bounding box or the foreground region associated with the object. One ROOE arrangement determines a rotation of the image plane such that the orientation line determined at step 930 is parallel to the vertical axis of the image coordinate frame. In one example, wherein the angle between the orientation line determined at step 930 and the vertical axis of the image plane is "a", the determined rotation is given by a "Rectification Transformation" in accordance with Equation (2) as follows:

$$\begin{pmatrix} x \\ y \end{pmatrix} = \begin{bmatrix} \cos a & -\sin a \\ \sin a & \cos a \end{bmatrix} \begin{pmatrix} p \\ q \end{pmatrix} \quad (2)$$

A rectified image is determined by resampling the original image as follows. For a pixel in the rectified image located at image coordinates (p, q), the corresponding pixel location (x, y) in the original image is determined according to the "Rectification Transformation" in Equation (2). The colour value at the pixel location (p, q) in the rectified image is then determined by interpolating the colour values in the neighbourhood of the location (x, y) in the original image. The colour values at all pixel locations in the resampled image are determined similarly.

The method 900 concludes after completing the rotating step 940.

In another application, the vertical vanishing point detected by method 400 is used to detect whether someone has tampered with the viewpoint of a security camera. In one ROOE arrangement, the method 400 is applied at regular intervals on a single camera view. One example of a regular interval is to apply method 400 to a camera view over a time period, such as once per day. At each application of method 400, the location of the determined vertical vanishing point is compared to the location of the vertical vanishing point determined at the previous application of method 400 to the same camera view. If the distance between the determined vertical vanishing points is greater than a fixed threshold distance, the viewpoint is determined to have changed. One example of a fixed threshold distance is 10% of the width of the image. The changing of the viewpoint can be evidence of a re-positioning of the camera, indicative of tamper by an unscrupulous person.

In another application, the (vertical) vanishing point detected by method 400 is used to stabilise the video frames captured by a camera mounted on an unstable platform. Each captured video frame is corrected for frontal rotation by keeping its vertical vanishing point in an upward direction. Alternatively, physical rotation correction can be applied to automatically level the camera if such mechanical movement is supported by the mounting system. It is commonly known in the art that the corrected orientation can be regularised (e.g., by Kalman filtering or Gaussian smoothing) prior to correction to maintain a smooth stabilisation.

In another application, the variation in the regularised orientation estimated by method 700 can be used as a soft-biometric for person re-identification across a sequence of video frames. Given that the orientation of a person changes with a periodic pattern as the person walks, this gait or variation pattern is unique for an individual and can therefore be used to re-identify that person in another camera view.

INDUSTRIAL APPLICABILITY

The arrangements described are applicable to the computer and data processing industries and particularly for the determination of image vanishing points, as often desired for object identification in video sequences. The specific implementations described are focussed on detection of persons (pedestrians), and thus operate upon the vertical vanishing point. This notwithstanding, other implementations may be equivalently performed making use of other vanishing points, notably the horizontal vanishing point, for example for motor vehicle detection and tracking, obtained through determination of horizontal axes for objects over the sequence of image (video) frames.

The foregoing describes only some embodiments of the present invention, and modifications and/or changes can be made thereto without departing from the scope and spirit of the invention, the embodiments being illustrative and not restrictive.

The claims defining the invention are as follows:

1. A method associated with a camera view of a moving object in a scene, the method comprising:
    detecting and tracking the moving object over multiple video frames;
    estimating an orientation of the moving object in each of the video frames;
    constructing a cost map from the estimated orientations over the multiple video frames for finding a minimum cost path over the cost map;
    determining regularized orientation estimates of the moving object from the minimum cost path; and
    locating the vanishing point of the camera view based on an axis of the moving object from the minimum cost path, wherein the axis formed uses the regularized orientation estimates.

2. The method according to claim 1, wherein the vanishing point is a vertical vanishing point and the formed axis is a vertical axis.

3. The method according to claim 1, wherein the vanishing point is a horizontal vanishing point and the formed axis is a horizontal axis.

4. The method according to claim 1, wherein estimating the orientation includes estimating the orientation from a major axis of a foreground region of the moving object.

5. The method according to claim 1, wherein estimating the orientation includes estimating the orientation from a peak of a gradient orientation histogram over a bounding box associated with the moving object.

6. The method according to claim 1, wherein estimating the orientation includes estimating the orientation from an axis of symmetry of a cost map determined over a bounding box associated with the moving object.

7. The method according to claim 2, further comprising rotating a graphical representation of the moving object to an upright location based on the vertical vanishing point.

8. The method according to claim 1, further comprising detecting a change in the vanishing point over a period of time to assess tamper of a camera imaging the scene.

9. The method according to claim 2, further comprising stabilizing the video frames captured by a camera imaging the scene using the vertical vanishing point.

10. The method according to claim 1, wherein an object in the scene is identified in one video frame, the method further comprising re-identifying the moving object in a subsequent video frame based on a variation pattern of the regularized orientation estimate.

11. A non-transitory computer readable storage medium having a computer program recorded therein, wherein the computer program is executable by a computer apparatus to make the computer apparatus perform a method associated with a camera view of a moving object in a scene, the method comprising:
    detecting and tracking the moving object over multiple video frames;
    estimating an orientation of the moving object in each of the video frames;
    constructing a cost map from the estimated orientations over the multiple video frames for finding a minimum cost path over the cost map;
    determining regularized orientation estimates of the moving object from the minimum cost path; and
    locating the vanishing point of the camera view based on an axis of the moving object from the minimum cost path, wherein the axis formed uses the regularized orientation estimates.

12. A system comprising:
    a memory for storing data and a computer program;
    a processor coupled to the memory for executing the computer program, wherein the computer program is executable by a computer apparatus to make the computer apparatus perform a method associated with a camera view of a moving object in a scene, the method comprising:
    detecting and tracking the moving object over multiple video frames;
    estimating an orientation of the moving object in each of the video frames;
    constructing a cost map from the estimated orientations over the multiple video frames for finding a minimum cost path over the cost map;
    determining regularized orientation estimates of the moving object from the minimum cost path; and
    locating the vanishing point of the camera view based on an axis of the moving object from the minimum cost path, wherein the axis formed uses the regularized orientation estimates.

13. An apparatus to perform a method associated with a camera view of a moving object in a scene, the apparatus comprising:
    a detecting and tracking unit configured to detect and track the moving object over multiple video frames;
    an estimating unit configured to estimate an orientation of the moving object in each of the video frames;
    a constructing unit configured to construct a cost map from the estimated orientations over the multiple video frames for finding a minimum cost path over the cost map;
    a determining unit configured to determine regularized orientation estimates of the moving object from the minimum cost path; and
    a locating unit configured to locate the vanishing point of the camera view based on an axis of the moving object from the minimum cost path, wherein the axis formed uses the regularized orientation estimates.

* * * * *